(Model)
J. L. BERGEN.
FERTILIZER DISTRIBUTER.
No. 256,625. Patented Apr. 18, 1882.
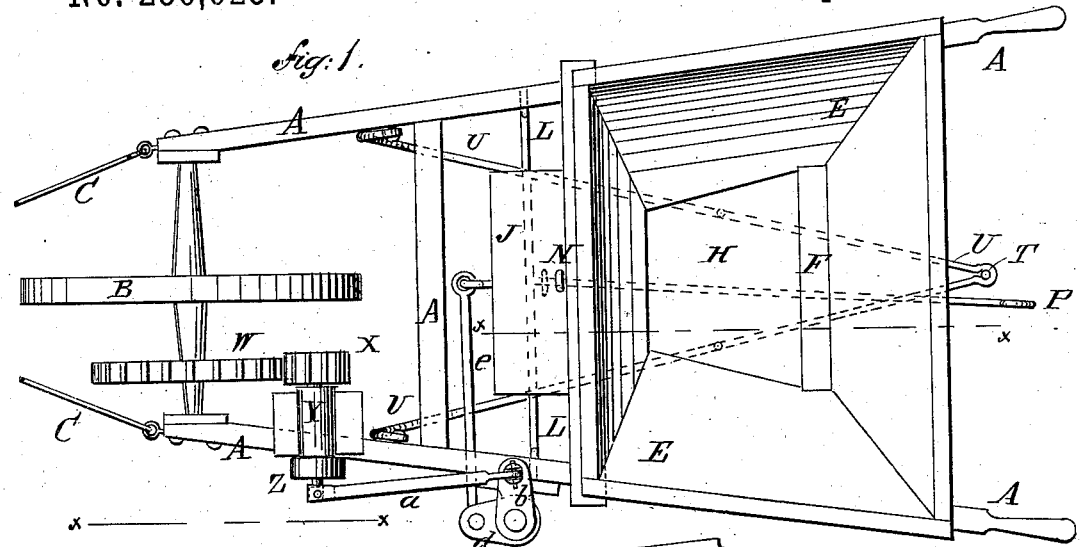
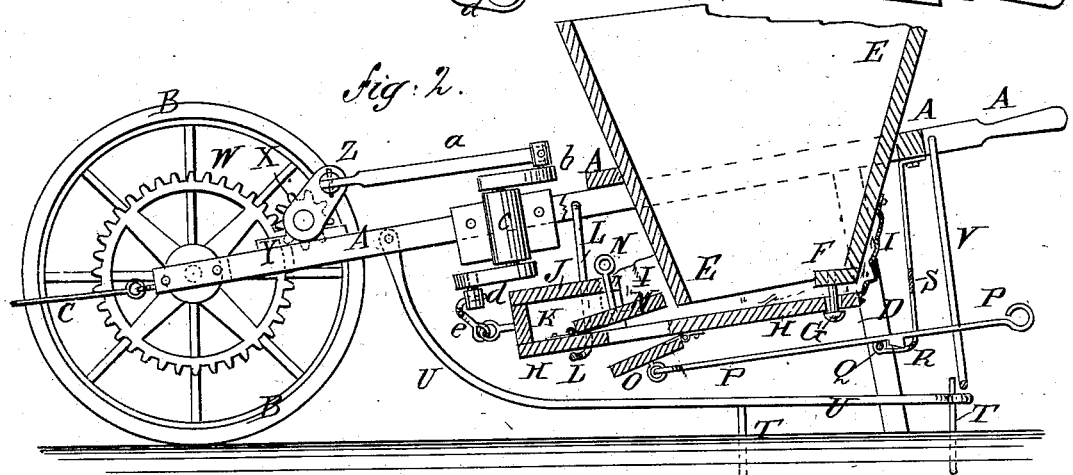
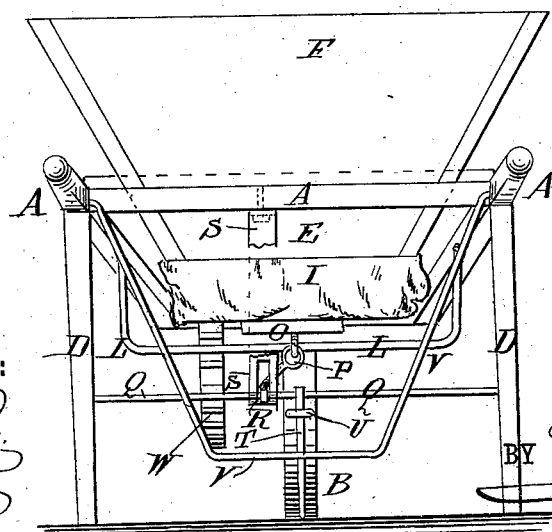
WITNESSES:
Chas. Nida
C. Sedgwick
INVENTOR:
J. L. Bergen
BY
Munn & Co.
ATTORNEYS.

UNITED STATES PATENT OFFICE.

JEROME L. BERGEN, OF FLATLANDS, ASSIGNOR TO HIMSELF AND GEORGE B. FORRESTER, OF BROOKLYN, NEW YORK.

FERTILIZER-DISTRIBUTER.

SPECIFICATION forming part of Letters Patent No. 256,625, dated April 18, 1882.

Application filed December 8, 1881. (Model.)

*To all whom it may concern:*

Be it known that I, JEROME L. BERGEN, of Flatlands, in the county of Kings and State of New York, have invented a new and useful Improvement in Fertilizer-Distributers, of which the following is a full, clear, and exact description.

Reference is to be had to the accompanying drawings, forming part of this specification, in which similar letters of reference indicate corresponding parts in all the figures.

Figure 1 is a plan view of my improvement. Fig. 2 is a sectional side elevation of the same, taken through the line $xxxx$, Fig. 1. Fig. 3 is a rear elevation of the same.

The object of this invention is to facilitate the distribution of chemical manures, guano, and other fine fertilizers, and promote uniformity in the said distribution.

The invention consists in a novel construction and arrangement of parts, as hereinafter fully described.

A represents the frame of the machine, which consists of two side bars connected by cross-bars. The side bars of the frame A incline toward each other, and to and between their forward ends is pivoted a wheel, B, in the manner of a wheelbarrow.

To the forward ends of the side bars of the frame A are attached the ends of a bail, C, to the center of which the draft is applied. To the rear parts of the side bars of the frame A are attached legs D, to support the rear part of the machine when not at work.

To the rear part of the frame A is attached a hopper, E, to receive the fertilizer. The hopper E is made open at its bottom, except a narrow strip, F, at the rear side. To the center of the strip F is attached a bolt, G, to which is pivoted the rear part of an apron or distributing-plate, H. The apron H is connected at its rear edge and at the rear parts of its side edges with the lower part of the hopper E by a strip, I, of leather or other flexible material. The apron H projects in front of the hopper E, and is covered with a board, J, the side and front edges of which are connected with the side and front edges of the forwardly-projecting part of the apron H by narrow boards K. The forward end of the apron H rests and slides upon the horizontal middle part of a rod, L, the end parts of which are bent upward and are attached to the side bars of the frame A. In the apron H, in front of the hopper E, is formed an opening, through which the fertilizer escapes to the ground.

The amount of fertilizer distributed is regulated by a valve-plate, M, which is placed above the discharge-opening of the apron H, and is raised, lowered, and supported by a screw, N, which passes down through the board J and screws into the said valve, M, so that the size of the discharge-opening can be regulated by turning the said screw N.

To the lower side of the apron H, at the rear side of its discharge-opening, is hinged the rear edge of a valve-plate, O, to the lower side of which is hinged the forward end of a rod, P. The rod P extends back into such a position that its rear end can be readily reached and operated by the operator walking at the rear of the machine. The rod P rests upon a cross-rod, Q, the ends of which are attached to the legs D. Upon the rod P is formed, or to it is attached, a projection or stop, R, to rest against the forward side of the supporting-rod Q to hold the valve O closed when it is desired to prevent the escape of the fertilizer when turning around at the side of the field and when passing from place to place. The rod P can be kept from lateral movement by passing through a slotted upright, S, attached to the rod Q and to the hopper E or the rear cross-bar of the frame A.

The fertilizer is mixed with the soil by the teeth T, attached to the V-shaped rod U, the forward ends of which are curved upward and are attached to the forward parts of the side bars of the frame A.

To the rear parts of the side bars of the frame A are attached the ends of a rod, V, the middle part of which hangs at such a height that it can rest above the rear part of the toothed bar or mixer U to hold the teeth T down to their work, and can be swung beneath the rear end of the said bar U to support the teeth T out of contact with the ground when turning around and when passing from place to place.

To the hub of the wheel B is attached a large gear-wheel, W, into the teeth of which mesh the teeth of a small gear-wheel, X, journaled in a bearing, Y, attached to a side bar of the frame A. To the journal of the gear-wheel X is attached a small crank, Z, to which is pivoted the end of a connecting-rod, a. The other end of the connecting-rod a is pivoted to a crank, b, journaled in a bearing, c, attached to the side of a side bar of the frame A.

To the lower end of the journal of the crank b is attached a crank, d, to which is pivoted the end of a connecting-rod, e. The other end of the connecting-rod e is hinged to the board K, attached to the forward edge of the apron H, so that the said apron will be vibrated laterally to discharge the fertilizer by the advance of the machine.

Having thus fully described my invention, I claim as new and desire to secure by Letters Patent—

1. In a fertilizer-distributer, the combination, with the hopper E, of the vibrating distributing-plate H, pivoted at its rear end to the under side of the hopper, and provided with adjustable gage-valve M and stop-valve O, and the means for vibrating the said plate, substantially as and for the purpose set forth.

2. In a fertilizer-distributer, the combination, with the hopper E, provided with the strip F in its bottom, of the vibrating distributing-plate H, pivoted to the said strip at its rear end, and connected to the hopper by its flexible strip I, and provided with the adjustable gage-valve M and stop-valve O, and means for vibrating the said distributing-plate, substantially as and for the purpose set forth.

3. In a fertilizer-distributer, the combination, with the vibrating distributing-plate H, provided with the discharge-opening, and the rod Q, attached to the legs D, of the stop-valve O, hinged to the said plate, the rod P, provided with the stop R, and the slotted upright S, substantially as and for the purpose set forth.

4. In a fertilizer-distributer, the combination, with the frame A and the toothed bar U, of the swinging bail V, substantially as herein shown and described, whereby the said toothed bar can be held down to its work and supported above the ground, as set forth.

5. In a fertilizer-distributer, the combination, with the frame A and the open-bottom hopper E, of the vibrating distributing-plate H, pivoted at its rear end to the hopper, and provided with a discharge-opening and regulating-valves, the bent rod L, and the means for vibrating the said plate, substantially as and for the purpose set forth.

6. In a fertilizer-distributer, the combination, with the drive-wheel B, the hopper E, and the vibrating distributer-plate H, pivoted to the hopper, and provided with the end plate, K, of the gear-wheels W X, the cranks Z b d, and the connecting-rods a e, substantially as and for the purpose set forth.

7. In a fertilizer-distributer, the combination, with the vibrating distributing-plate H, projecting in front of the hopper, and covered by the board J, of the gage-valve M, hinged to the said plate, and the screw N, substantially as and for the purpose set forth.

JEROME L. BERGEN.

Witnesses:
    JAMES T. GRAHAM,
    C. SEDGWICK.